(12) United States Patent
Brenton

(10) Patent No.: US 6,443,100 B1
(45) Date of Patent: Sep. 3, 2002

(54) DEBRIS SEPARATING SYSTEM FOR FISH PENS

(75) Inventor: Clayton Mearle Brenton, Nanaimo (CA)

(73) Assignee: Future Sea Technologies Inc., Nanaimo (CA)

( * ) Notice: Subject to any disclaimer, the term of this patent is extended or adjusted under 35 U.S.C. 154(b) by 0 days.

(21) Appl. No.: 09/775,731

(22) Filed: Feb. 5, 2001

(51) Int. Cl.$^7$ .............................. A01K 63/04; E04H 3/16
(52) U.S. Cl. .................... 119/259; 210/169; 210/512.1; 210/416.2; 119/223; 119/245; 119/232; 119/211; 119/224
(58) Field of Search ................................. 119/264, 232, 119/228, 211, 259, 224, 226–229; 210/169, 512.1, 416.2

(56) References Cited

U.S. PATENT DOCUMENTS

| | | | |
|---|---|---|---|
| 1,528,179 A | * | 3/1925 | Baldridge |
| 2,010,435 A | * | 8/1935 | Matheson |
| 2,931,504 A | * | 4/1960 | Troland |
| 3,239,149 A | * | 3/1966 | Lindberg, Jr. |
| 4,655,169 A | | 4/1987 | Paliola |
| 4,798,168 A | | 1/1989 | Vadseth et al. |
| 5,116,488 A | * | 5/1992 | Torregrossa ................. 209/170 |
| 5,593,574 A | | 1/1997 | Van Toever |
| 5,636,595 A | * | 6/1997 | Lunde et al. ................ 119/224 |
| 5,640,930 A | * | 6/1997 | Kirby .......................... 119/263 |
| 6,093,320 A | | 7/2000 | White |

FOREIGN PATENT DOCUMENTS

DE  4326755 A1 * 2/1995 .......... A01K/63/04

* cited by examiner

*Primary Examiner*—Peter M. Poon
*Assistant Examiner*—Andrea Valenti
(74) *Attorney, Agent, or Firm*—C. A. Rowley

(57) ABSTRACT

A debris separating system for separating debris in a fish tank is formed by a standpipe extending up through the bottom of tank at the center of tank and terminating in an open end. A cover covers the opening and is spaced therefrom to provide an inlet opening positioned above the bottom of the tank. A transition zone is formed at the bottom of the tank surrounding the standpipe and a debris outlet is provided from this zone through the bottom of the tank for removal of debris separated in the transition zone. Cleaned water from the transition zone flows up around the standpipe, through the inlet opening and into the standpipe for removal from the tank.

15 Claims, 3 Drawing Sheets

DEBRIS SEPARATING SYSTEM FOR FISH PENS

FIELD OF INVENTION

The present invention relates to an improved system for removal of debris from a fish pen.

BACKGROUND OF THE INVENTION

It is common practice for the commercial purposes to grow aquatic organisms such as fish and the like in tanks or bag like structures hereinafter referred to as fish tanks or pens. One of the main problems of growing these aquatic organisms is the disposal of sediment such as excrement and other debris that would otherwise build in the bottom of the tank or to be released into the surrounding waters and cause contamination detrimental to the process or the surrounding environment.

There have been numerous proposals and applied systems for cleaning aquaculture tanks many of which take the debris off from the bottom of the tank. See for example U.S. Pat. No. 4,655,169 issued Apr. 7, 1987 to Paliola; U.S. Pat. No. 4,798,168 issued Jan. 17, 1989 to Vadseth et al.; U.S. Pat. No. 5,593,574 issued Jan. 14, 1997 to VanToever; U.S. Pat. No. 5,636,595 issued Jun. 10, 1997 to Lunde et al.; and U.S. Pat. No. 6,093,320 issued Jul. 25, 2000 to White.

All of the systems described in the patents use water movement to help to deliver the sediment to a sediment outlet, for example rotating flow in circular tanks to sweep the sediment toward the centre of the tank U.S. Pat. No. 4.655,169 referred to above describes a system wherein conical grooves are provided in the bottom end of the tank and a circular flow is imparted into the water in the tank to cause the debris that settles to the bottom of the tank to be swept along the conical grooves into a collecting chamber or sump at the center of the tank. This system obviously relies on gravity for separation of the sediment from the water i.e. the sediment falls by gravity to the bottom of the tank and thus concentrated debris is swept along the helical bottom passages to a sump.

U.S. pat. No. 4,798,169 injects fresh water substantially tangentially adjacent to the top of the tank and imparts a significant velocity to the water to cause it to flow around the tank with sufficient velocity to cause the fish in the tank to orient themselves relative to the current created by the circular flow in the tank. A simple outlet is provided at the apex of the tapered bottom of the tank and the debris is brought to this outlet for removal from the tank by the circulating water.

U.S. Pat. No. 5,593,574 discloses a water treatment system for fish tanks that includes a biofilter system that uses a spray bar to distribute water over a bed of pellets. The treated water is removed adjacent to but spaced above the bottom of the biofilter tank through an outlet pipe having an inlet sheltered under a cone. Debris is removed through a sump at the bottom of the biofilter tank surrounding the outlet pipe.

U.S. No. Pat. 5,639,595 employs an annular chamber or sump surrounding a main tank outlet defined by an upper deck spaced from the bottom of the tank to provide a flow inlet extending around the full circumference of the sump. The sump is frusta-conical tapering towards a bottom end that is provided with a debris outlet adjacent to the central or axial main outlet passage from the tank. Outlet holes connect the sump with the main outlet passage at a position well above the debris outlet in the bottom of the sump. Water carrying debris flows into the chamber substantially radial around the full periphery of the chamber and towards the bottom and then flows back up and out through the outlet passages leading to the main passage. Debris falling from the water entering the sump is removed via the debris outlet. This system does not significantly concentrate the sediment for removal.

U.S. Pat. No. 6,093,320 belonging to the same company as the present invention teaches a cleaning system that employs a baffle system and injectors for imparting tangential velocity to the water entering the sump to separate the debris below the baffle and remove it through a sump and the cleaned water that carried the debris into the sump flows over the baffle and is released.

BRIEF DESCRIPTION OF THE PRESENT INVENTION

It is an object of the present invention to provide a debris separating system that is easy to operate and employs the water currents in the fish tank to deliver the debris to an outlet. Broadly the present invention relates to a debris separating system for separating debris in a fish tank having a substantially circular cross section and wherein incoming water is pumped into the tank with momentum substantially tangent to the periphery of said tank to cause said water to flow with a circular motion from the top toward the bottom of said tank, said tank having a bottom, said debris separating system comprising a standpipe concentric with said tank and extending through said bottom of said tank to a position below a surface of water in said tank, said stand pipe having an open upper end spaced from said bottom of said tank, and expanded section of said standpipe surrounding said open end, a cover concentric with said open end and spaced above said open end to define an inlet passage into said open end between said expanded section of said standpipe, said cover having a diameter greater than said open upper end to shelter said open end from debris that may fall from water above said open end and to disrupt a vortex formed in said tank by said incoming water.

Preferably the ratio of the depth D of said open upper end of said standpipe from said surface of said water in said tank to the depth d to said bottom of said tank is between 0.7 and 0.9.

Preferably said debris separating system further comprises a plurality of circumferentially spaced vanes arranged symmetrically around said inlet passage.

Preferably, said vanes have a pair of opposite faces along which said water flows into said open end and wherein said faces are oriented at an angle of between 35 and 50° to a radius of said standpipe.

Preferably said cover is a convex dome shape with its convex surface facing away from said open upper end.

Preferably said dome is substantially conical.

Preferably said debris separating system further comprises an inverted cone concentric with said open upper end with its conical surface facing said open end, said inverted cone having a diameter less than said diameter of said dome.

Preferably said outlet system combines with the adjacent portions of said bottom of said tank to define a transition zone surrounding said standpipe Preferably a debris outlet is provided through said bottom wall adjacent to said standpipe.

BRIEF DESCRIPTION OF THE DRAWING(S)

Further features, objects and advantages will be evident from the following detailed description of the preferred embodiments of the present invention taken in conjunction with the accompanying drawings in which.

DETAILED DESCRIPTION OF THE INVENTION

The present invention relates to a system for separating debris which may include particles of fish waste, uneaten food and the like which must be removed from the tank and disposed of is a suitable manner.

Figure 1:
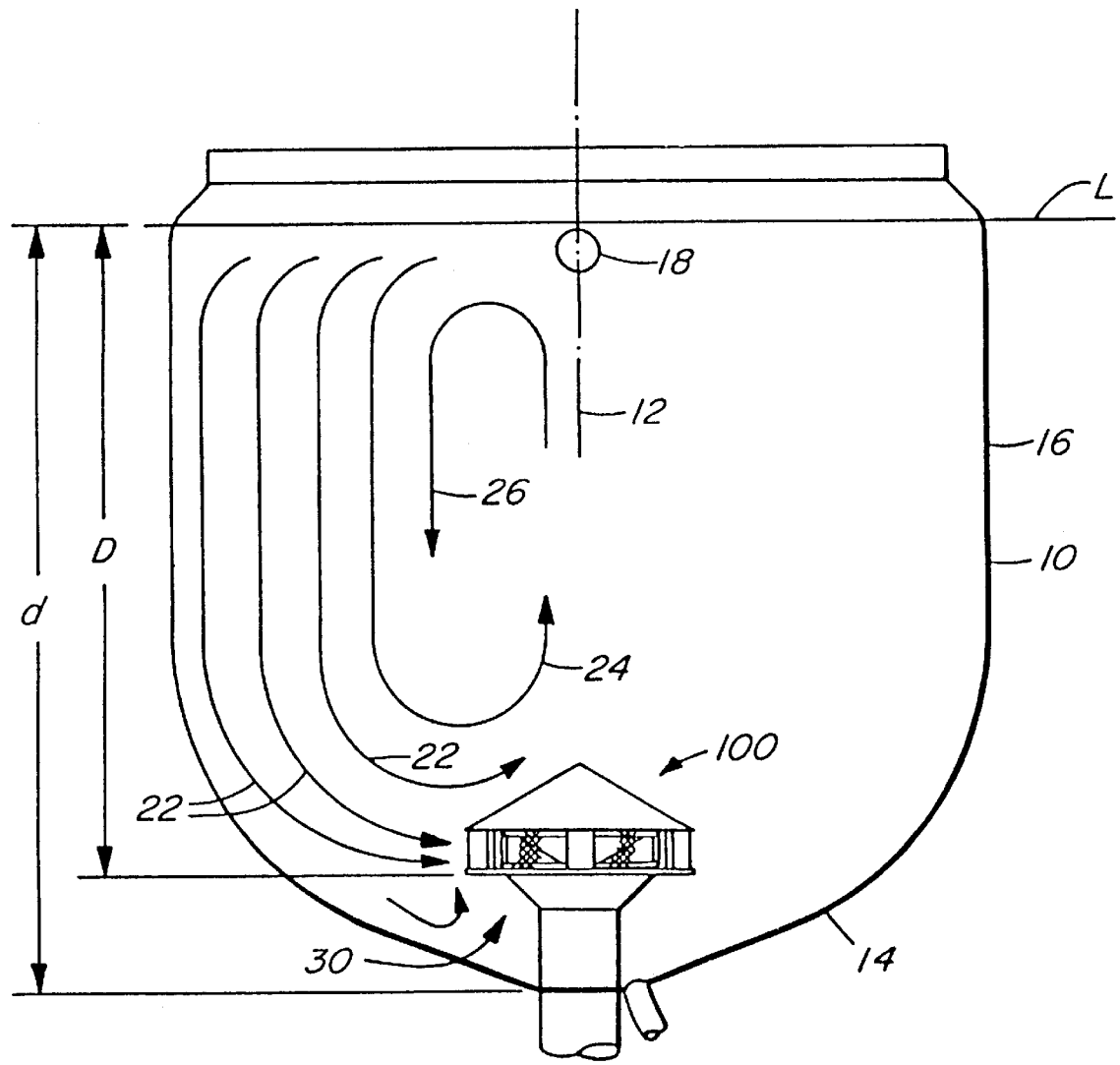
FIG. 1 is a schematic side elevation of fish tank incorporating the debris separating system of the present invention and showing the vertical flow pattern of the water in the tank.
Figure 2:
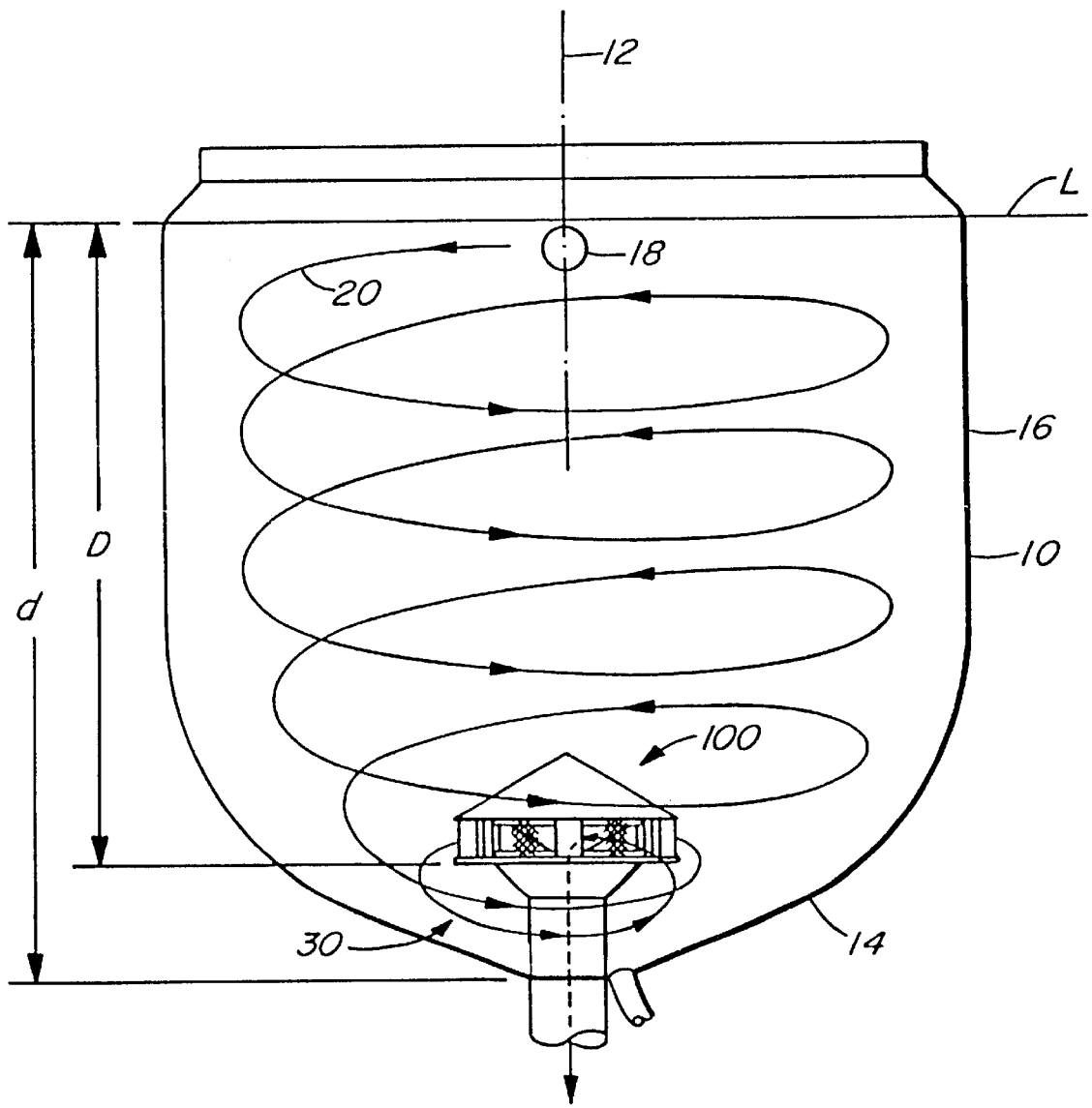
FIG. 2 is a schematic side elevation of fish tank incorporating the debris separating system of the present invention and showing the horizontal flow pattern of the water in the tank.

FIG. 1 shows a fish tank 10 positioned in a body of water (fresh or salt) the surface of which is indicated at L. The pen or tank 10 is preferably circular in cross section and has a centerline 12 and a convex bottom portion 14 that converges from the outer peripheral wall 16 toward the centerline 12. Adjacent to the top of the tank is a substantially tangential inlet 18 that is oriented to direct fresh water moved by a suitable pump (not shown) into the tank 10 and provide the water with momentum to flow around the tank 10 as indicated by the arrow 20 in FIG. 2. The flow of the water also has a downward component as indicated by the arrows 22 in FIG. 1. This downward component is reversed as indicated by the arrow 24 above the debris separator system or unit 100 positioned on the centerline 12 at the bottom of the tank 10 as will be discussed below. This reversal of flow to the upward direction is again reversed above the separator 100 and adjacent to the surface of the water in the pen 10 to tend to flow back down as indicated by the arrow 26. It will be apparent that the flow of water in the pen is substantially symmetrical about the axis 12.

Figure 3:
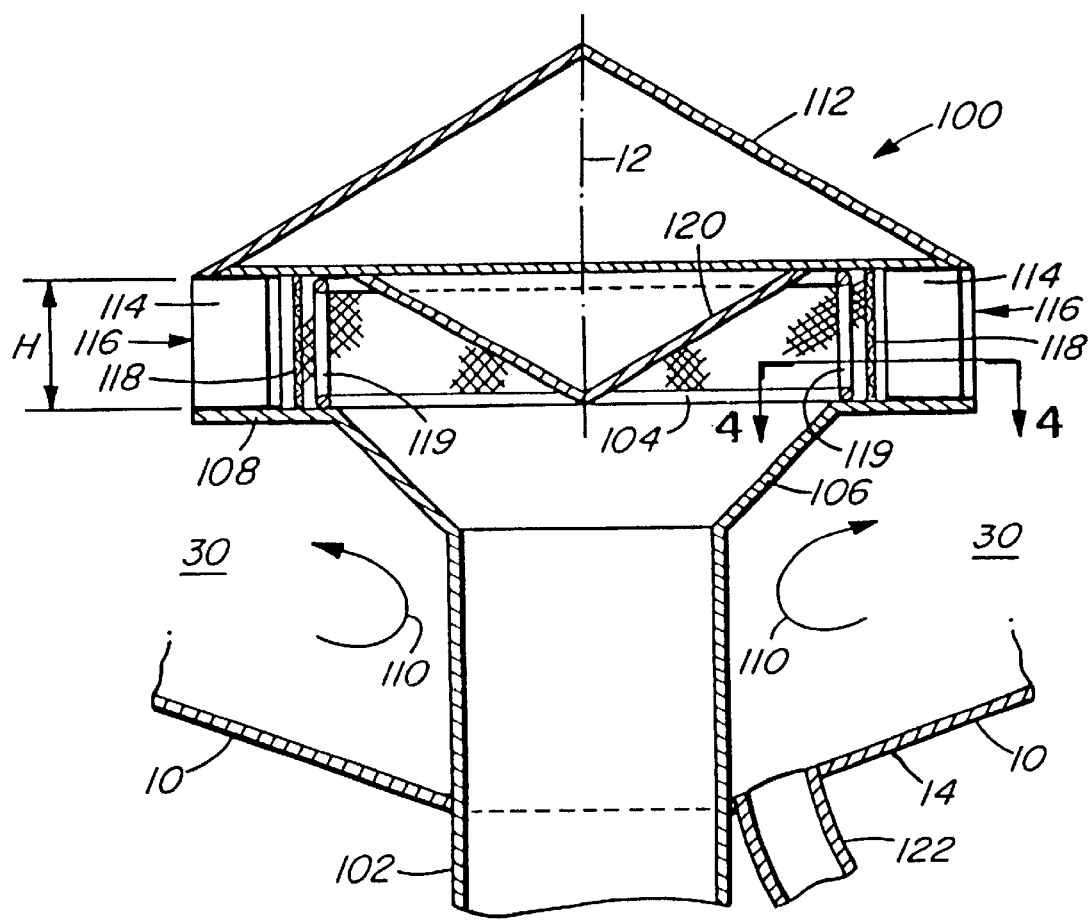
FIG. 3 is a cross section through the debris separating system of the present invention.

This circulation of the water around and above the unit 100 as indicated by the arrows 20, 22, 24 and 26 creates a transition or quiescent zone 30 in volume extending in the area surrounding the unit 100 from the bottom 14 and up to about flange 108 as will be described below As shown in FIG. 3 the unit 100 is composed of a standpipe 102 that has its axis concentric with the axis 12 and extends through the bottom portion 14 and into the tank 10 to a position spaced well below a surface L of the water in the tank 10. The standpipe 102 has an upper or top opening 104 into the standpipe 102. In the illustrated arrangement, the ratio of depth D from the surface L to the level of the opening 104 to the depth d to the bottom of the tank 10 from the surface L (D/d) will never—be less than 0.5 and preferably will be in the range of between 0.7 and 0.9. In a particular system with a tank 10 meters deep, a standpipe height of 1.5 meters has been found satisfactory, i.e. d=10 meters, D=8.5 meters, D/d=0.85.)

In the arrangement illustrated the diameter of the pipe 102 flares outward in frusta conical fashion as indicated at 106 to provide an upper opening larger than the diameter of the pipe 102. A substantially radial flange 108 surrounds the opening 104. It can be seen that the overhang created by the cone 106 and flange 108 results in a requirement that flow from the bottom of the zone 30 adjacent to the standpipe 102 must reverse and flow back outward i.e. away from the axis 12 and upward as indicated by the arrow 110 to reach the top inlet end of the standpipe 102.

Positioned above and spaced from the opening 104 and the flange 108 is a cover 112 that is concentric with the axis of the pipe 102 and concentric with the axis 12 of the tank 10. The cover 112 in the illustrated arrangement has a convex surface facing away from the opening 104. The cover 112 has a diameter greater than that of the opening 104 and preferably greater than the outside diameter of the flange 108 to protect the opening 104 from receiving debris falling from water above the unit 100. The dome 112 is preferably a cone shape and aids in diverting debris from the top of the cover and in directing the flow to make its first reversal as indicated by the arrow 24, hence disrupting any strong vortex action in the center of the tank 10.

Figure 4:
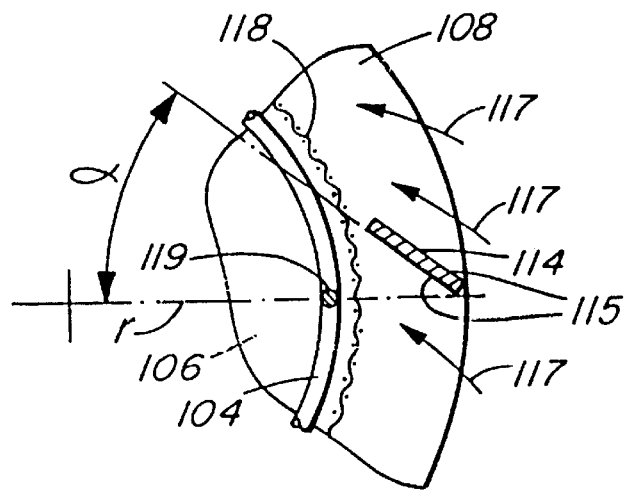
FIG. 4 is a partial section with parts removed for clarity on the line 4—4 of FIG. 3 showing the orientation of the vanes relative to the direction of flow of the water entering the standpipe.

A plurality of circumferentially spaced vanes 114 extend between the flange 108 and the cover 112 and help to support the cover in fixed spaced relationship to the opening 104. A tubular support frame 119 is located between flange 108 and the cover 112 and provides the majority of the support for the cover 112. The vanes 114 are uniformly spaced i.e. symmetrically positioned around the periphery of the opening 104 with their side faces 115 oriented to interfere slightly with the flow and divert it into the opening 104 i.e. the faces 115 are substantially parallel to the direction of water flow (as represented by the arrows 117) as the water flows past the vanes 114 and into the pipe 102 i.e. the vanes function to direct the flow of water into the opening 104 as indicated in FIG. 4 without providing an major impedance to the flow. In a preferred arrangement the angle α of sides 115 of the vanes 114 to a radius r of the pipe 102 is preferably in the range of 35 to 50° and will be in part determined by the velocity and flow of the water into and out of the tank 10 which is also influenced by the inside diameter of the standpipe 102 and the height H of the spacing between the flange 108 and the dome 112 which in part defines the size of the circumferentially extending inlet 116 opening leading to the pipe 102. The vanes 114 are preferably widely circumferentially spaced for example with a flange 108 having an outside diameter of about 3 meters 4 vanes symmetrically positioned around the pipe 102 have been found to be satisfactory.

In one particular realization of the invention in a tank of about 12 meters in diameter and a volume of about 875 cubic meters and with an incoming water flow rate of between 20,000 to 60,000 liters/minute the standpipe 102 had an inside diameter of about 1200 millimeters (mm), flared out to about 1950 mm in the flared section 106 and the outside diameter of the flange 108 was about 3000 mm. Four symmetrically spaced vanes were used. Each of the vanes 114 had a thickness of 6 mm, a length measured in the direction of flow of about 400 mm and a height (i.e. height H) of about 1000 mm. The end facing outward was filleted at its side edges, but remained essentially blunt. The dimension may be changed to accommodate different size pens and different flow rates.

As above described the circumferentially extending inlet 116 opening though which the water flows to reach the opening 104 is formed between the adjacent surfaces of the cover 112 and the flange 108 and extends from the outer edge of the flange 108 to the inner edge of flange 108 where the flange 108 joins with the frusta conical flare 106. Across this inlet opening 116 adjacent to the inner periphery of the flange 108 i.e. inside (or outside if desired) of the vanes 114 is a screen 118 that extends around the inner periphery of the inlet opening 116 to screen any water entering through the inlet opening 116. The screen 118 is attached to the tubular support structure 119 and functions primarily to stop fish from escaping and thus may have corresponding sized holes.

It is preferred to provide a cone 120 inverted relative to and concentric with the cover or dome 112 to direct flow entering through the inlet 116 into the opening 104 and thus the standpipe 102.

Debris separated in the transition zone 30 is removed from the tank or pen 10 via the debris outlet 122 (see FIG. 3).

In operation fresh water enters the tank 10 via inlet 18 and flows in the tank as indicated by the arrows 20, 22, 24, 26 and 110. The unit 100 impedes the flow adjacent to the center of the bottom of the pen 10 and creates the transition zone 30 surrounding the unit 100. Debris moves down the tank generally adjacent to the wall 16 and then along the wall 14 into the transition zone 30 and the debris is dropped from the water in the zone 30. The cleaned water then flows as indicated by the arrows 110 up along the outside of the unit 100 until it reaches the inlet 116 where it passes through the screen 118 and then through the opening 104 into the standpipe 102 and back into the surrounding waters. The debris separated in the zone 30 moves to the outlet 122 and is ejected from the tank and directed to a suitable disposal site.

Having described the invention, modifications will be evident to those skilled in the art without departing from the scope of the invention as defined in the appended claims.

I claim:

1. A debris separating system for separating debris in a fish tank having a substantially circular cross section and wherein incoming water is pumped into the tank with momentum substantially tangent to the periphery of said tank to cause said water to flow with a circular motion from the top toward the bottom of said tank, said tank having a bottom, said debris separating system comprising a standpipe concentric with said tank and extending through said bottom of said tank to a position below a surface of water in said tank, said stand pipe having an expanding section defining an open upper end of said stand pipe spaced from said bottom of said tank a cover concentric with said open upper end and spaced above said open upper end closing said open upper end and defining at its outer periphery one side of an inlet passage into sad open upper end between said cover and said expanding section of said stand pipe, said inlet passage providing the inlet for fluid flow from said tank into said standpipe, a plurality of circumferentially spaced vanes arranged symmetrically around said inlet passage in spaced relation to said open end and to direct flow into said open end, said cover having a diameter greater than said open upper end to shelter said open upper end from debris that may fall from water above said open upper end and to disrupt a vortex formed in at the center of the tank by said incoming water.

2. A debris separating system as defined in claim 1 wherein the ratio of the depth D of said open upper end of said standpipe from said surface of said water in said tank to the depth d to said bottom of said tank is between 0.7 and 0.9.

3. A debris separating system as defined in claim 2 wherein said vanes have a pair of opposite faces along which said water flows into said open end and wherein said faces are oriented at an angle of between 35 and 50° to a radius of said standpipe.

4. A debris separating system as defined in claim 3 wherein said expanding section is positioned relative to said tank to combine with the adjacent portions of said bottom of said tank to define a transition zone surrounding said standpipe.

5. A debris separating system as defined in claim 2 wherein said cover has a convex dome shape with its convex surface facing away from said open upper end.

6. A debris separating system as defined in claim 5 further comprising an inverted cone concentric with said open upper end with its conical surface facing said open end, said inverted cone having a diameter less than said diameter of said dome.

7. A debris separating system as defined in claim 5 wherein said dome is substantially conical.

8. A debris separating system as defined in claim 2 wherein said expanding section is positioned relative to said tank to combine with the adjacent portions of said bottom of said tank to define a transition zone surrounding said standpipe.

9. A debris separating system as defined in claim 1 wherein vanes have a pair of opposite faces along which said water flows into said open end and wherein said faces are oriented at angle of between 35 and 50° to a radius of said standpipe.

10. A debris separating system as defined in claim 9 wherein said expanding section is positioned relative to said tank to combine with the adjacent portions of said bottom of said tank to define a transition zone surrounding said standpipe.

11. A debris separating system as defined in claim 1 wherein said cover has a convex dome shape with its convex surface facing away from said open upper end.

12. A debris separating system as defined in claim 11 wherein said dome is substantially conical.

13. A debris separating system as defined in claim 12 further comprising an inverted cone concentric with said open upper end with its conical surface facing said open end, said inverted cone having a diameter less than said diameter of said dome.

14. A debris separating system as defined in claim 4 wherein said expanding section is positioned relative to said tank to combine with the adjacent portions of said bottom of said tank to define a transition zone surrounding said standpipe.

15. A debris separating system as defined in claim 1 wherein said expanding section is positioned relative to said tank to combine with the adjacent portions of said bottom of said tank to define a transition zone surrounding said standpipe.

* * * * *